Figure 3:
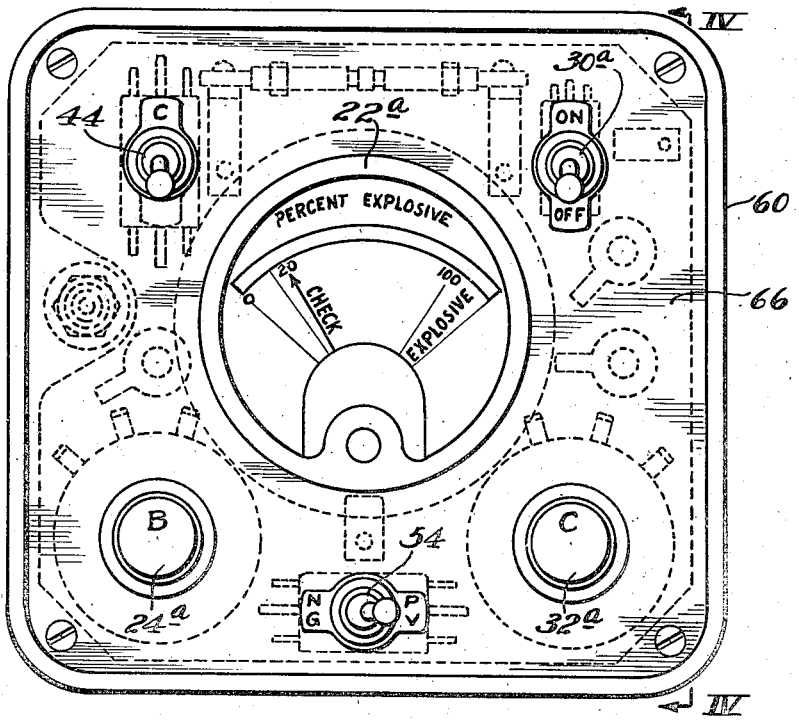

Jan. 15, 1946. M. G. JACOBSON ET AL 2,393,220
COMBUSTIBLE GAS INDICATOR
Filed Nov. 4, 1938 2 Sheets-Sheet 1
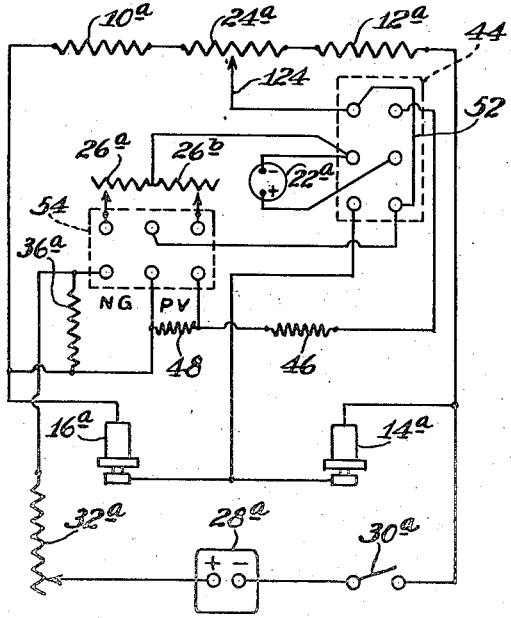
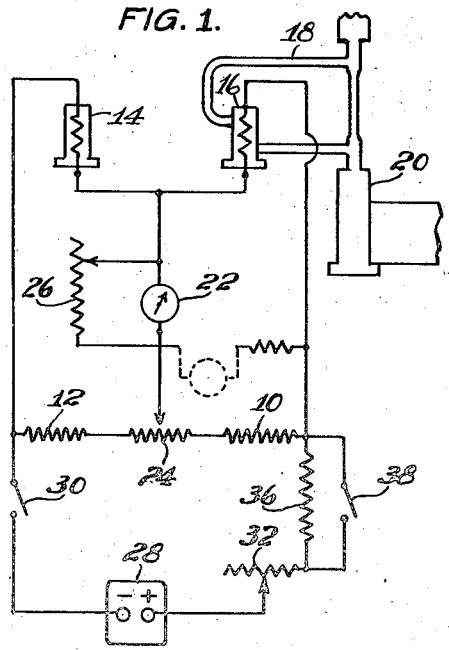
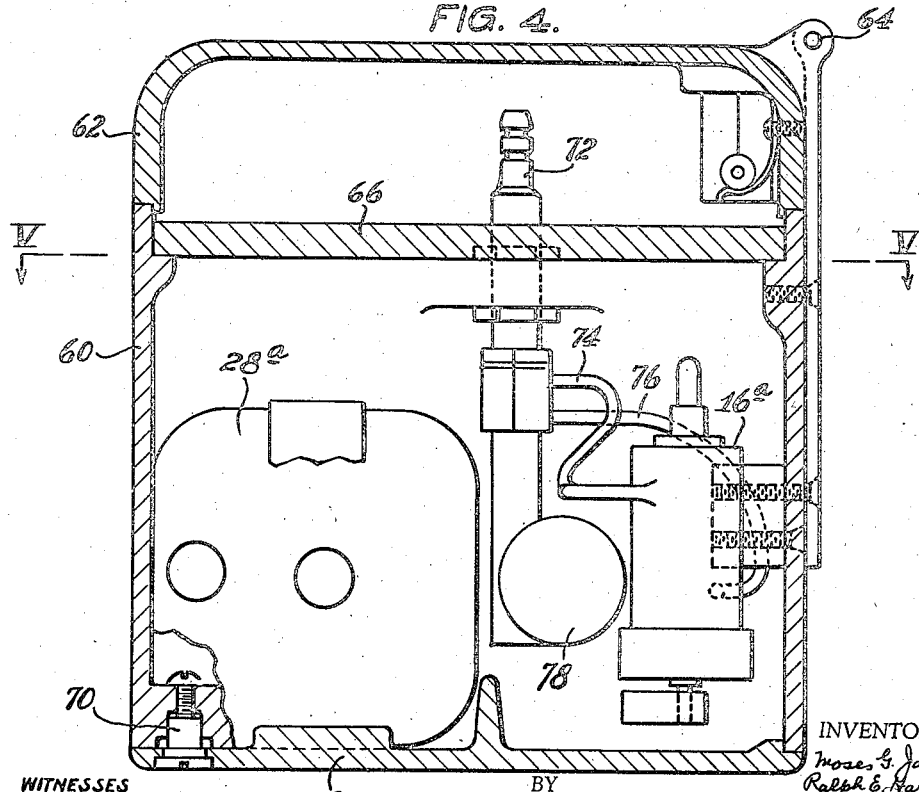
INVENTORS
Moses G. Jacobson
Ralph E. Hartline
BY Brown, Critchlow & Flick
their ATTORNEYS.
WITNESSES
A B Wallace
A H Oldham Patented Jan. 15, 1946

2,393,220

UNITED STATES PATENT OFFICE 2,393,220

COMBUSTIBLE GAS INDICATOR

Moses G. Jacobson, Pittsburgh, and Ralph E. Hartline, Swissvale, Pa., assignors to Mine Safety Appliances Company, Pittsburgh, Pa., a corporation of Pennsylvania Application November 4, 1938, Serial No. 238,768

2 Claims. (Cl. 23—255)

This invention relates to methods and apparatus by means of which one or more components of different ignition temperature in a mixture of several combustible gases may be independently determined.

Some gases, as, for example, methane and natural gas, have a much higher ignition temperature than others, for example, hydrogen and petroleum vapors, and the ignition temperature by means of a catalytic platinum filament is also correspondingly higher. Broadly this has been recognized heretofore, and "fractional combustion" has been employed; but in previous methods of fractional combustion the component to be measured is first completely burned out, and then quantitatively determined by the volume contraction of the sample either directly or after absorption of its products of combustion. The present method makes the determination at the very time the fractional combustion is occurring by measuring in a flowing sample the rate of combustion, or the heat evolved by the combustion per unit time. This is done by observing a quantity which is a definite function of that rate, as for instance, the temperature of a body adjacent to the combustion space, the temperature of a catalyst or the electrical resistance of a filament placed inside the combustion chamber. In addition, fractional combustion in the past has always been done by relatively complicated methods and apparatus involving elaborate steps and adjustments which are not adapted to operation on a flowing or readily replaceable gas sample or to portable use.

It is the general object of our invention to provide methods and apparatus for direct selective testing and quantitative determination of components in a mixture of combustible gases or vapors at the same time the combustion of the mixture is carried out at a number of different temperatures.

It is also an object of our invention to provide simplified methods and inexpensive portable apparatus for distinguishing between combustible gases and vapors of different ignition temperatures and for direct indication of their concentrations in a mixture of combustibles.

One of the particular applications of this invention is in case of presence of a combustible, for instance, in the basement of a building or in a manhole, to quickly determine whether the combustible is due to leakage from gas lines or to seepage of gasoline from storage tanks.

Another object of our invention is the provision of improved methods and apparatus for determining the presence and concentration of combustible gas of different ignition temperatures by combustion on an electrically heated detector filament, and wherein the same detector filament connected in a balanced electrical testing circuit may be heated to any desired one of several widely different temperatures without destroying the adjustment of the electrical circuit.

Another object of our invention is to provide testing apparatus for the purpose described, and wherein the electric circuits and the use of appropriate switches eliminate the necessity for separate check and zero adjustments on each of the several operating temperatures provided.

Another object of the invention is the provision of gas testing methods and apparatus for operation on gas of different ignition temperatures, and whereby the electrical heating potential and the zero position of the indicating galvanometer can be adjusted or checked in exactly the same manner before testing for the presence of any one of several different gases and need not again be checked immediately before testing for the presence of another gas.

There is considerable discrepancy in the literature on the values of the ignition temperature of the various combustible gases and vapors. One factor influencing this discrepancy is the method of ignition. In our preferred apparatus, the combustion occurs on the surface of a catalytically active platinum wire. It must be emphasized that ignition or the beginning of combustion occurs under these conditions at temperatures greatly different than those normally considered as the "ignition temperature" of the gas or vapor. For example, the ignition temperature of hydrogen is generally given as approximately 1000° F. On the surface of our filament combustion occurs at a point well below 200° F. On the other hand, hexane, which has a normal ignition temperature of approximately 500° F., does not burn on our detector filament until a temperature considerably above that required for hydrogen is reached.

It is definitely known that the combustion or oxidation on the surface of fine platinum wires under conditions of operation used in our device is not true ignition of the gaseous phase. Apparently, only the combustible molecules actually contacting the filament are oxidized. The phenomenon more properly comes under the classification of surface combustion or surface oxidation. Therefore, wherever in this application the term "ignition temperature" is used in connection with our new method and apparatus it should be understood that the particular temperature is meant at which combustion of the gases in question begins to occur under the specified conditions, as for instance in our preferred embodiment on the surface of a platinum wire. It should also be understood that wherever the terms "combustion temperature" or "oxidation temperature" are used in this application, they stand for short expressions of the sentences: "lowest temperature at which combustion occurs under the specified conditions" or "lowest temperature at which oxidation occurs under the specified conditions."

While in older methods of fractional combustion, the combustible constituents below a certain ignition temperature are completely burned out, in our method this is not at all necessary; indeed in most cases only a small percentage of the combustibles of appropriate ignition temperature admitted to an instrument is burned. While some older methods are based on the measurements of the effects of the total heat of combustion, the basis of our method is the experimental fact that the rate of combustion on the surface of a wire or on a catalytic or another oxidizing agent, or any other quantity which is dependent upon the rate of combustion is a definite function of the concentration of the combustibles in the sample as long as the latter is reaching the place of combustion continually and at a substantially constant rate. This is accomplished either by supplying the sample directly to the oxidizing agent and maintaining a constant sample flow or by letting the sample reach the oxidizing agent by diffusion, thermal convection or the like, in which case the sample flow to the instrument need not be constant but only above a certain minimum.

The foregoing and other objects of the invention are achieved in our preferred embodiment by the provision of apparatus including a detector filament incorporated in an electric testing circuit and means for flowing the gas to be tested over the detector filament. Further, the apparatus includes electrical means for maintaining the detector filament at a temperature sufficient to ignite the gas to be tested having one ignition temperature, and means for changing the circuit to alter the temperature of the detector filament when testing for a gas having a different ignition temperature. A galvanometer is incorporated in the electric circuit for indicating the concentration by change of balance of the combustible gas in the gas sample when the sample is passed over the detector filament, and a switch means is provided for connecting the galvanometer in testing position or in a position to check the voltage of the detector filament. Completing the combination are means adapted to be connected in the circuit so that the voltage check position of the galvanometer pointer is the same regardless of the particular temperature of the detector filament in the circuit.

In accordance with the improved method of our invention, a gas sample is passed at a definite rate of flow over a filament connected in a balanced electrical circuit, and the filament is heated to a temperature to burn gas having a combustion temperature below a predetermined point. The sample gas is usually thereafter continuously passed over the filament which is then heated to another temperature to burn gas having a combustion temperature below another predetermined point, and measurements are taken directly on the same indicating means to show the concentration of the burning gas in the sample tested when the filament is at either of the stated temperatures. The difference of these two indications gives the concentration of all gases whose ignition temperature is above the lower and at or below the higher of the two temperatures. The method may include the further step of heating the filament electrically, and prior to test determining that the electric potential heating the filament is adjusted to a constant value regardless of the actual potential to be applied to the filament during test.

Figure 5:
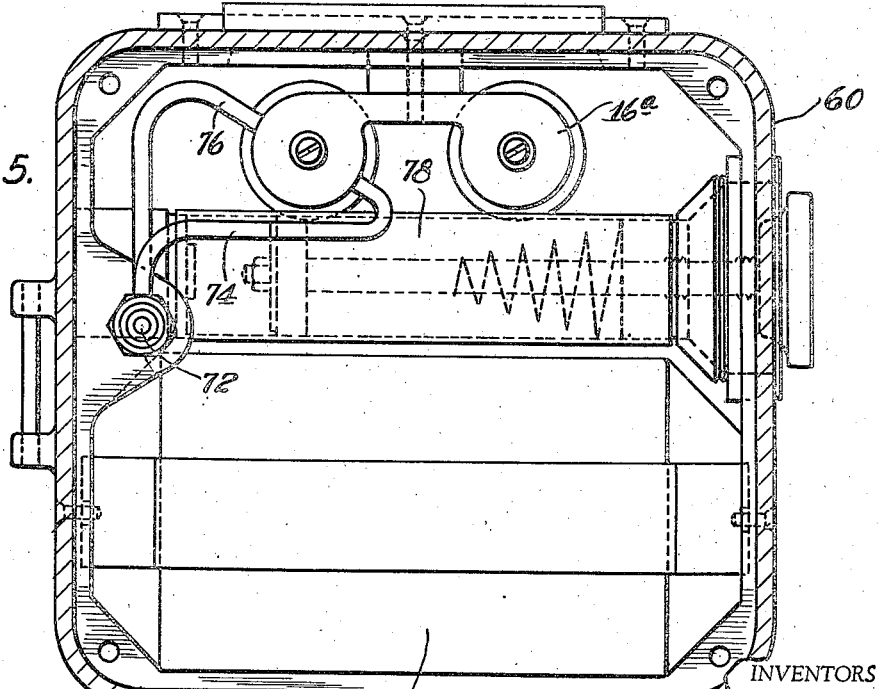

For a better understanding, reference should be had to the accomapnying drawings wherein Fig. 1 is a schematic diagram of the flow system and electrical connections of the basic form of our preferred embodiment; Fig. 2 is a complete electric circuit diagram of the improved and preferred embodiment of our invention; Fig. 3 is a plan view of a commercial apparatus incorporating the principles of our invention; Fig. 4 is a vertical cross sectional view taken on line IV—IV of Fig. 3; and Fig. 5 is a horizontal sectional view taken on line V—V of Fig. 4.

While the principles of our invention can be applied to apparatus of various sizes and weights and can be adapted to operations upon gases of various ignition temperatures, our invention is particularly adapted to be employed in conjunction with operations to determine the per cent of natural gas or methane in air and the per cent of petroleum vapor in air. Further, our improved methods and apparatus are particularly adapted to portable or field operations. Accordingly, our invention has been illustrated and will be described in conjunction with the determination of natural gas and petroleum vapors by portable apparatus and field-operating methods.

Referring particularly to Fig. 1, the numerals 10 and 12 indicate two resistances of a Wheatstone bridge circuit, and the numerals 14 and 16 indicate, respectively, a compensating filament and a detector filament which complete the Wheatstone bridge. The compensating filament 14 is usually made from a material with the same thermal coefficient as the detector filament and serves to maintain the circuit stabilized, when the applied voltage is changed. The compensating filament is rendered inactive in this embodiment in so far as combustion is concerned by totally enclosing it in a gas-tight housing. However, in other embodiments the compensating filament may be made inactive by poisoning, by operating it at a lower temperature or in any other way known to the art. The detector filament 16 is in the operation of the circuit heated to a temperature sufficient to ignite the combustible component of a gas sample passed thereover by way of the flow system 18 which includes a pump 20. In accordance with the usual practice, the Wheatstone bridge circuit just described includes a bridging galvanometer 22 which is connected adjustably to a rheostat 24 positioned between the resistances 10 and 12. A rheostat 26 is shunted across the galvanometer 22 and acts as a calibration control therefor so that the deflection of the galvanometer pointer produced by a given concentration of combustible vapor may be adjusted to any desired point on the meter scale. An electric potential is applied, usually by a battery 28, to the opposite ends of the Wheatstone bridge and effects the heating of the detector filament 16. An on-and-off switch 30 connects the battery to the Wheatstone bridge circuit, and a rheostat 32 connected in series with the battery can be adjusted to provide a constant electrical potential for the Wheatstone bridge.

An important part of our present invention is the provision of a testing apparatus which is adapted to determine the combustible amount of gas igniting at one temperature in a given sample and which apparatus will also serve to determine the combustible amount in the same or a different gas sample of a second gas igniting at a different temperature. To this end we provide in the circuit a resistance 36 which is connected in series with the battery 28, but which is adapted to be shunted out by a switch 38. Thus, when the switch 38 is opened the resistance 36 is in series with the battery 28 and the actual potential applied to the opposite ends of the Wheatstone bridge and across the detector filament 16 is less than the potential applied thereto when the shunting switch 38 shorts out the resistance 36. In this way, by opening and closing the switch 38, we are able to maintain the detector filament 16 at either one of two predetermined temperatures. The relation of the resistance 36, the battery 38, and the detector filament 16 is such that with the switch 38 closed the detector filament will burn each combustible gas present in the gas sample tested which ignites below a predetermined temperature. Specifically, in the apparatus illustrated, the detector filament will burn both petroleum vapor and natural gas or methane when the switch 38 is closed. However, with the switch 38 open and the resistance 36 in series with the battery 38, the detector filament 16 will be maintained at a lower temperature which is sufficient to burn petroleum vapors, but is not sufficient to burn the natural gas in the sample. Thus, if the meter is calibrated to indicate the total amount of combustibles being burned, the second reading will give the concentration of the petroleum vapor in the sample, and the difference between the first and second readings will give the concentration of the natural gas present.

In the schematic representation of Fig. 1 dotted lines indicate the electrical position of the galvanometer 22 when in the voltage-check position. It will be understood that in the operation of the testing apparatus of the character herein described, it is necessary in the continued use of the apparatus and before testing after over-night stands and the like to determine that the potential applied to the Wheatstone bridge and/or to the detector filament is a standard, i. e., is exactly the same as in prior tests, so that calibration of the apparatus is not affected or improper test data taken. The rheostat 32 controls the potential applied to the Wheatstone bridge and/or to the detector filament and permits adjustment thereof to a standard. It has been shown in U. S. Patent No. 2,114,383, issued heretofore to one of the two present inventors, that in order to keep the temperature of the detector filament constant against evaporation from its surface, it is necessary to maintain a constant electrical potential across it. It also was shown that by maintaining a constant voltage across the detector filament a better constancy of the bridge sensitivity is obtained than by keeping the bridge voltage itself invariable. Therefore, we prefer to adjust to a constant voltage applied to the detector filament rather than to the total voltage of the bridge. The particular circuit connection used to accomplish this and shown in Figs. 1 and 2 is one of the subject-matters of a copending application of the same inventors. In portable apparatus of this general type it is our practice to employ the indicating galvanometer itself as a means to accurately set the voltage-adjusting rheostat 32 to establish a standard electrical potential. Hence in the embodiment of the invention shown, switch means (not shown in Fig. 1 but designated by 44 in Fig. 2) are provided for switching the galvanometer 22 from the full-line position indicated to the dotted-line position shown. In the dotted-line position the galvanometer is in a position to check the potential of the detector filament 16, and we provide a check marking on the galvanometer dial so that by adjusting the rheostat 32 the needle of the galvanometer is brought over the check marking, and thus a uniform detector filament potential for each test is assured. In the operation of the apparatus for testing purposes the galvanometer 22 is switched back into the circuit, as shown in full-line.

However, with the circuit of Fig. 1, a different check reading will be obtained on the galvanometer 22 when the switch 38 is open than will be obtained when it is closed. Accordingly, in the preferred form of our invention we have provided an electrical circuit wherein the same check reading may be taken on the bridge or detector potential regardless of whether the circuit is arranged for operating the detector filament at one or another temperature. Our improved circuit will now be described; also in the simple basic embodiment of Fig. 1 on rheostat 26 only one adjustment of the meter calibration is provided while in general the sensitivity of the device at different filament temperatures will not be the same. In our improved circuit when switching over to another filament temperature, the sensitivity is also automatically adjusted to the correct value.

In the form of our invention diagrammatically illustrated in Fig. 2, the numerals 10a and 12a indicate two resistors which are interconnected through an adjustable potentiometer rheostat 26a. These two resistors together with the adjoining parts of the rheostat 26a up to the sliding contact 124 form the two arms of the Wheatstone bridge, which are in parallel respectively with the detector filament 16a and the compensator filament 14a. A galvanometer 22a is connected to the central terminals of a double-pole double-throw switch 44. The terminals at the upper end of the switch 44 are connected, respectively, to the adjustable potentiometer rheostat 26a and to a resistance 46. The upper left terminal of switch 44 is also connected by means of the wire 52 with the lower right terminal of the same switch. The resistance 46 is connected through a resistance 48 to one end of the Wheatstone bridge. The same end of the Wheatstone bridge is connected to a resistance 36a which is connected through a voltage-adjusting rheostat 32a with a battery 28a. The other side of the battery 28a is connected by way of an on-and-off switch 30a to the other side of the Wheatstone bridge, specifically the resistance 12a and the compensator filament 14a.

The terminals at the lower end of the double-pole double-throw switch 44 are connected, respectively, to the series connection between the detector and compensator filaments and to the left upper terminal of the switch which is in turn connected to the adjustable contact of the rheostat 26a. Thus, when the blades of the switch 44 are thrown to the lower position marked "read" the galvanometer 22a is bridged across the Wheatstone bridge. However, when the blades of the switch 44 are thrown to the upper position marked "check" the galvanometer is connected through resistance 46 or 46 and 48 across the bridge arm 10a and the left part of 24a, both of which together are in parallel with the detector 16. This bridge arm, according to a fundamental property of the Wheatstone bridge, has the same potential across it as the detector, when the bridge is in the balanced condition. Thus, with switch 44 in the "check" position the galvanometer serves as a voltmeter to indicate the potential drop across the detector filament. When the blades of switch 54 are on the right side (marked P. V.—Petroleum Vapors) resistor 48 is shorted out and the galvanometer in its "check" position would give a higher deflection for the same potential drop. Resistor 46 is so chosen that with the right potential across the detector for the lower temperature of the latter, the galvanometer pointer reaches a predetermined mark. Resistance 48 is so chosen that when switch 54 is turned to the left (marked N. G.—Natural Gas) to provide a higher potential and temperature for the detector filament, the galvanometer reading in the "check" position, which otherwise would be higher, is returned to the same predetermined position as before.

The switch 54 has three functions in addition to the functions described in the preceding paragraph. It controls the ignition temperature of the detector filament and thus the determination of combustible gas igniting at a specific temperature. In other words, with the switch 54 thrown to the left, the circuit arrangement is for the testing of natural gas and all other gases having similar or lower ignition points. However, when the switch is thrown to the right, the apparatus is connected for the ignition of petroleum vapors or other gases having similar or lower ignition points and will not indicate natural gas or other gases having high ignition points. When the switch 54 is in the left-hand position, it will be seen that the resistance 36a is shunted by one of the switch blades so that it is in effect not in the circuit, and the full battery potential less only the part absorbed in the adjustment rheostat 32a is applied to the Wheatstone bridge so that the detector filament is raised to its highest testing temperature. With the blades thrown to the right-hand side of the switch 54, the resistance 36a is in series with the battery 28a and reduces the potential actually applied to the ends of the Wheatstone bridge and thus to the detector filament 16a. Accordingly, the detector filament is operated at a lower temperature which is just sufficient to burn out the combustible petroleum vapors or other combustibles igniting at a temperature similar thereto or below the ignition temperatures of petroleum vapor.

Switch 54 has also a third function. This is to maintain the proper sensitivity for the indications of the galvanometer when switching over from one combustion temperature to another. In general, the same total amount of combustibles when burned at two different ignition temperatures will not give the same galvanometer deflection regardless of whether the scale is calibrated in percent of the lower explosive limit or in percent of volume concentration in air. Therefore, it is necessary to have a different resistance in parallel with the indicating galvanometer in each of the two positions of switch 54. These resistances are preferably both made variable, so that when the calibration is made the galvanometer deflection can be adjusted for each of the two combustion temperatures independently. In our preferred embodiment, as shown in Fig. 2, both of these adjustable resistances consist of one special slide wire rheostat 26a, 26b with a common midpoint terminal and two slider terminals, one on either side of the midpoint.

As an example of the specific values of the several resistances incorporated in the apparatus as just described, but with a clear understanding that these values are in no way limiting, we have successfully operated our apparatus with the resistance 10a of about 17 ohms, the resistance 12a of about 17 ohms, the resistance of the compensator and detector filaments of about 1.30 ohms each when testing for natural gas, and about .84 ohm each when testing for petroleum vapors, the resistance 24a of about 3 ohms, the resistance 32a of about 3 ohms, the resistance 36a of about 2.4 ohms, the resistance 46 of about 1820 ohms, and the resistance 48 of about 2150 ohms. The detector filament 16a is operated at a potential of about .77 volt for natural gas and at a potential of about .37 volt for petroleum vapors. The resistances 26a and 26b are each of about 10 ohms and serve in a manner similar to the rheostat 26 to provide proper full-scale reading of the galvanometer 22a.

In the commercial embodiment of our invention, which as heretofore stated, is particularly adapted for portable or field use, the numeral 60 indicates a container having a lid 62 secured thereto, usually by a suitable hinge 64. Positioned between the lid 62 and the container 60 is an instrument-carrying panel 66 on which the galvanometer 22a, the on-and-off switch 30a, the voltage-adjusting rheostat 32a, the zero-adjusting rheostat 24a and the switches 44 and 54 are mounted in visible and operable positions. The battery 28a is mounted inside of the container 60 below the instrument panel 66, and the bottom of the container, which is indicated by the numeral 68, may be made removable, as by the provision of screws 70, to permit the ready removal of a discharged battery and the insertion of a new or charged battery.

It will be understood that the container 60 includes a flow system for receiving and conducting a gas sample around either both the detector and compensator filaments or only the detector filament. This flow system may take a variety of forms, but has been illustrated as including a nipple 72 which extends through the instrument panel 66 and to which a hose or other conduit or gas sample line may be quickly secured. The nipple 72 is connected by way of a suitable conduit 74 to the detector unit 16a and by way of a conduit 76 to a pump 78 which extends through the side wall of the container 60 so that by suitable reciprocation of the pump a gas sample will be drawn through the nipple 72, the conduit 74, the detector unit 16a, the conduit 76, and discharged out of the pump. An aspirator bulb may be employed instead of the pump 78 if this is found more convenient.

The remaining parts of the apparatus and of the electrical circuit as hereinbefore particularly described in conjunction with Figs. 1 and 2 are all received within the container 60, and thus the apparatus becomes completely self-contained. From the fact that Figs. 3, 4 and 5 in the original patent drawing are very nearly of actual size, it will be evident that the entire apparatus is of relatively small size and is quite light and portable, but is adapted to the ready yet accurate, determination of combustible gas contents in air or other gas, and to a series of related tests in which the content in a gas sample of one combustible gas is first determined with subsequent determinations of other combustible gases therein having different ignition temperatures.

From the foregoing it is believed that the operation of our improved apparatus and the procedure of our improved methods will be entirely evident. Briefly reiterating, however, in a test operation the switch 30a is first thrown into the on position and the switch 44 is thereupon moved to the check position. Rheostat 32a is now adjusted until the pointer of the galvanometer is brought over the check position on the dial of the galvanometer at which time it is known that the detector filament potential is at a standard and the test is ready to proceed. This check setting operation may be performed with the switch 54 in either the natural gas or the petroleum vapor position as heretofore explained. However, before proceeding with the test, the switch 44 should be moved to its operating position and the knob of the rheostat 24a adjusted to bring the pointer of the galvanometer exactly to zero. Now, the pump 78 is operated to draw at a definite rate of flow a sample of gas to be tested over the detector filament, at which time all combustible matter in the sample having an ignition temperature below a certain limit will burn on the surface of the detector filament, and the resistance change of the latter will produce on the dial of the galvanometer a corresponding indication in total concentration percentage of combustibles or in percents of the lower explosive limit.

If the foregoing test has been taken with the switch 54 in the right-hand or petroleum vapor position, only petroleum vapor or other gases having a similar or lower ignition temperature will be burnt. Immediately after this, while continuing to draw the sample by pump 78, without any readjustment or checking of the instrument, switch 54 is thrown to the left-hand position. Now all combustible components, including methane, natural gas or other high ignition temperature gases are being burnt, and the galvanometer pointer indicates the total amount of combustibles having ignition temperatures up to the higher ignition point of the detector. Obviously if no natural gas or other high ignition temperature components are present, the reading on the dial in the second position of switch 54 will be the same as in its first position. If natural gas, or another high ignition gas is present, the second reading will be higher, and the amount of the high ignition component will be equal to the difference between the two readings.

From the foregoing it will be recognized that the objects of our invention have been achieved by the provision of simplified methods and apparatus for determining the presence and explosive amounts of combustible gas or gases having different ignition temperatures. We have broadly referred in the specification and in certain claims to the determination of explosive amounts of combustible gas in a given sample. It should be understood that in actual practice the apparatus is frequently calibrated to indicate the per cent of the lower explosive limit of the gas sample, one hundred per cent being explosive. We have expressed the per cent of the explosive limit in certain of the claims and in parts of the specification in a somewhat more specific manner by defining it as the "explosive per cent."

While our invention has been particularly described in conjunction with operations upon natural gas and petroleum vapors, it should be expressly understood that we contemplate operations upon gases having various ignition temperatures above or below those of petroleum vapor and natural gas or methane, and that we particularly contemplate the provision of methods and apparatus for operations upon hydrogen as well. Such methods and apparatus may include the fractional combustion of hydrogen first, petroleum vapors second, and natural gas and methane third. This may be particularly used to measure the amount of hydrogen in manufactured gas, or to distinguish between the latter and petroleum vapors or between the latter and natural gas.

From the foregoing it will be recognized that in the platinum filament of our preferred embodiment three functions of our method are combined. That of a catalytic igniter, that of a heater, and that of a resistance thermometer. It should, however, be understood that it is possible to use separate elements for each of these three functions to replace some of them by other forms producing the same results and in general to introduce many modifications without departing from the scope of our invention.

Therefore, while we have particularly illustrated and described our invention in accordance with the patent statutes, it should be clearly understood that our invention is not limited thereto or thereby but is defined in the appended claims.

We claim:

1. A portable apparatus for testing gas containing combustible material, comprising a case, a Wheatstone bridge circuit arranged within said case, a detector filament forming a part of said circuit, a battery disposed within said case for supplying electric potential to said filament, electrical connections between said battery and said circuit, gas sampling means carried by said case and associated with said filament for conducting a gas sample thereover, a galvanometer mounted in said case and normally connected across said bridge circuit and adapted to indicate the amount of combustible material present in the gas sample tested, two adjustable rheostat resistances and connections for alternately associating them electrically with the galvanometer, a switch provided with circuit connections for throwing said galvanometer from its normal position into a circuit connection including at least one additional resistance for checking the voltage applied to said filament, variable resistance means for adjusting said voltage to a predetermined value, and a double-pole double-throw switch, a separate resistance and circuit connections associated therewith for connecting said separate resistance in series with said battery to reduce the voltage applied to the filament and reduce its temperature, for simultaneously changing one of said additional resistances to obtain the same galvanometer reading with the reduced and unreduced voltage on the filament when checking the filament voltage and for simultaneously changing from one of said adjustable rheostats being associated with the galvanometer to the other.

2. Portable apparatus for selective testing of combustible gases with different ignition temperatures, comprising a case having a removable lid, a Wheatstone bridge circuit disposed in said case and including a detector filament, a battery disposed in said case for supplying an electric potential to said filament, electrical connections between said battery and circuit, gas sampling means carried by said case and associated with said filament for conducting a gas sample thereover, a galvanometer mounted in said case normally connected across said circuit and adapted to indicate the amount of combustible material present in the gas sample tested, a switch connected in said circuit for throwing the galvanometer from its normal position into a circuit connection including at least one resistance, other than said filament, for checking the voltage applied to said filament, separate variable resistance means connected in said circuit for adjusting said voltage to a predetermined value, a double throw switch, a fixed resistance, and circuit connections with said switch and fixed resistance for connecting the fixed resistance in series with said battery to reduce the voltage applied to the filament and reduce its temperature, and for simultaneously changing one of said additional resistances to obtain the same galvanometer reading with the reduced and unreduced voltage on the filament.

MOSES G. JACOBSON.
RALPH E. HARTLINE.